United States Patent
Alexander Elliot et al.

(10) Patent No.: US 8,369,487 B2
(45) Date of Patent: Feb. 5, 2013

(54) ENHANCED 911 NOTIFICATION FOR INTERNET ENABLED ALARM SYSTEM

(75) Inventors: Harvey Alexander Elliot, Ojai, CA (US); Bryan Field-Elliot, Ojai, CA (US); Daniel J Elliot, Ojai, CA (US)

(73) Assignee: Numerex Corporation, Atlanta, GA (US)

(*) Notice: Subject to any disclaimer, the term of this patent is extended or adjusted under 35 U.S.C. 154(b) by 1168 days.

(21) Appl. No.: 12/018,724

(22) Filed: Jan. 23, 2008

(65) Prior Publication Data

US 2008/0118039 A1 May 22, 2008

Related U.S. Application Data

(63) Continuation-in-part of application No. 11/517,025, filed on Sep. 7, 2006, now Pat. No. 7,613,278, which is a continuation-in-part of application No. 11/226,857, filed on Sep. 14, 2005, now Pat. No. 7,593,512, and a continuation-in-part of application No. 10/861,790, filed on Jun. 7, 2004, now Pat. No. 7,440,554, which is a continuation-in-part of application No. 10/840,280, filed on May 7, 2004, now abandoned, which is a continuation-in-part of application No. 10/462,708, filed on Jun. 17, 2003, now Pat. No. 7,245,703, application No. 12/018,724, which is a continuation-in-part of application No. 11/348,291, filed on Feb. 6, 2006, now Pat. No. 7,734,020.

(60) Provisional application No. 60/651,662, filed on Feb. 11, 2005, provisional application No. 60/389,960, filed on Jun. 20, 2002.

(51) Int. Cl.
*H04M 11/04* (2006.01)

(52) U.S. Cl. ............................................ 379/45; 379/40

(58) Field of Classification Search ............... 379/40, 379/45
See application file for complete search history.

(56) References Cited

U.S. PATENT DOCUMENTS

| | | | |
|---|---|---|---|
| 4,465,904 A | 8/1984 | Gottsegen et al. | |
| 4,692,742 A | 9/1987 | Raizen et al. | |
| 5,134,644 A | 7/1992 | Garton et al. | 379/39 |
| 5,365,568 A | 11/1994 | Gilbert | 379/43 |
| 5,463,595 A | 10/1995 | Rodhall | |
| 5,796,633 A | 8/1998 | Burgess et al. | 702/187 |
| 5,808,547 A | 9/1998 | Carney | |
| 5,877,684 A | 3/1999 | Lu | |
| 5,923,731 A | 7/1999 | McClure | 379/33 |
| 6,075,451 A | 6/2000 | Lebowitz et al. | 340/539.19 |
| 6,215,404 B1 | 4/2001 | Morales | |
| 6,272,212 B1 | 8/2001 | Wulforst et al. | 379/199 |
| 6,288,642 B1 | 9/2001 | Dohrmann | |
| 6,311,072 B1 | 10/2001 | Barclay et al. | 455/552 |
| 6,381,307 B1 | 4/2002 | Jeffers et al. | 379/142.01 |
| 6,452,490 B1 | 9/2002 | Garland et al. | 340/506 |
| 6,493,435 B1 | 12/2002 | Petricoin | 379/93.05 |
| 6,574,480 B1 | 6/2003 | Foladare et al. | |
| 6,577,234 B1 | 6/2003 | Dohrmann | |
| 6,603,845 B2 | 8/2003 | Jensen et al. | 379/142.01 |
| 6,661,340 B1 | 12/2003 | Saylor et al. | |
| 6,683,526 B2 | 1/2004 | Bellin | |
| 6,829,478 B1 | 12/2004 | Layton et al. | 455/428 |
| 6,831,557 B1 | 12/2004 | Hess | |
| 7,406,710 B1 | 7/2008 | Zellner et al. | |
| 2002/0177428 A1 | 11/2002 | Menard et al. | |

(Continued)

*Primary Examiner* — Alexander Jamal
(74) *Attorney, Agent, or Firm* — King & Spalding

(57) ABSTRACT

The present invention allows an alarm monitoring service to ally with a PSAP provider to allow our customers to direct connect to the 911 center responsible for their home, but no matter where the customer calls from. When an alarm monitoring company or middleware provider's automatic notification function calls the customer to report an alarm, the customer can connect directly to the local 911 even when traveling, if needed. The alarm monitoring company contacts the customer if an alarm event occurs and offers the customer the opportunity to connect with the 911 call center for their home. If the customer indicates they want to call 911, the call is routed to the correct PSAP center, with the customers home Caller ID number emulated for the call. In this manner, the PSAP center can determine, from the emulated Caller ID data, the correct response agency that is local to the customer's home.

2 Claims, 2 Drawing Sheets

U.S. PATENT DOCUMENTS

| | | |
|---|---|---|
| 2003/0128115 A1 | 7/2003 | Giacopelli et al. ............ 340/506 |
| 2004/0086093 A1 | 5/2004 | Schranz |
| 2004/0184584 A1* | 9/2004 | McCalmont et al. ........... 379/45 |
| 2006/0176167 A1 | 8/2006 | Dohrmann |
| 2007/0155412 A1* | 7/2007 | Kaltsukis ..................... 455/466 |
| 2008/0117029 A1 | 5/2008 | Dohrmann |

* cited by examiner

ENHANCED 911 NOTIFICATION FOR INTERNET ENABLED ALARM SYSTEM

CROSS-REFERENCE TO RELATED APPLICATIONS

The present application is a Continuation-In-Part of U.S. patent application Ser. No. 11/517,025 (ELLIOT-0007), filed on Sep. 7, 2006, and incorporated herein by reference; which in turn is a Continuation-In-Part of U.S. patent application Ser. No. 11/226,857 (ELLIOT-0005) filed on Sep. 14, 2005 and incorporated herein by reference; application Ser. No. 11/226,857 in turn claims priority from Provisional U.S. Patent Application Ser. No. 60/651,662 (ELLIOT-0004) filed on Feb. 11, 2005 and incorporated herein by reference; application Ser. No. 11/226,857 is also a Continuation-In-Part (CIP) of co-pending application Ser. No. 10/861,790 (ELLIOT-0003), filed on Jun. 7, 2004, and incorporated herein by reference; application Ser. No. 11/226,857 is in turn a Continuation-In-Part of U.S. patent application Ser. No. 10/840,280 (ELLIOT-0002) filed on May 7, 2004, and incorporated herein by reference, which in turn is Continuation-In-Part of U.S. patent application Ser. No. 10/462,708 (ELLIOT-0001) filed on Jun. 17, 2003, (now U.S. Pat. No. 7,245,705) and incorporated herein by reference, which in turn claims priority from Provisional U.S. Patent Application Ser. No. 60/389,960 (ELLIOT-0001P), also incorporated herein by reference. The present application is also a Continuation-In-Part (CIP) of co-pending U.S. patent application Ser. No. 11/348,291 (ELLIOT-0006) filed on Feb. 6, 2006 and incorporated herein by reference.

FIELD OF THE INVENTION

The present invention relates to an enhanced 911 notification for an Internet enabled alarm system. In particular, the present invention is directed toward an improve alarm monitoring system whereby when an alarm customer is notified of an alarm, the customer has the option of calling a 911 center and the system routes the call to the correct center for the alarm system location.

BACKGROUND OF THE INVENTION

PSAP is an acronym for Public Safety Answering Point, an agency in the United States, typically county or city controlled, responsible for answering 911 calls for emergency assistance from police, fire, and ambulance services. There are roughly 6,100 primary and secondary PSAPs in the United States. Each PSAP generally covers a particular geographic area or areas and dispatches police, fire, and ambulance services based on the nature of incoming calls.

Traditionally, with a POTS (Plain Old Telephone Service) line, a consumer would dial 911 to be connected directly to the PSAP in the event of an emergency. Using Caller ID, the PSAP could determine the location of the caller and dispatch emergency services (Fire, Ambulance, Police, and the like) to the correct location. However, as communications systems diversify and become more complex, difficulties arise when connecting a consumer to the appropriate PSAP. For example, when calling 911 on a cell phone, one might be connected with a 911 service center for another county or jurisdiction, if the cell tower the caller is communicating with is located in another jurisdiction (i.e., across a river, for example).

In addition, for the cellular user, if they are calling about an alarm in their home while they are not at home, their user's phone call might be routed to the wrong 911 call center and as a result, delay or prevent proper dispatching of emergency services.

Other communications systems have also become available which are supplementing and supplanting traditional POTS lines. Home alarm systems traditionally uses a POTS line with a DTMF (Dual Tone Multiple Frequency) signal to dial out to an alarm company, and report an alarm condition. However, these alarm systems may now require that the alarm company determine the nature of the emergency before calling the PSAP. False alarms have become so rampant that many jurisdictions are fining customers and/or alarm monitoring companies for false alarms. As a result, alarm-monitoring companies usually try to call the consumer to determine if a real emergency or a false alarm has taken place. This delay in verifying alarms can result in a fire burning out of control before fire equipment arrives, or an injured person dying before an ambulance arrives.

Some a Prior Art alarm systems allow a customer to connect to a Police or other emergency response number that the customer may specify. This connection may be made when the alarm monitoring system notifies the customer that an alarm has gone off. Alternatively, the alarm panel may be provided with a "panic" 911 feature or the like. When such features are activated, however, it is important that the correct PSAP center and number be called for rapid response.

Thus, it remains a requirement in the art to provide a method and apparatus whereby a consumer can be directly connected to the local PSAP or 911 call-center, regardless of where the customer is located and calling from.

SUMMARY OF THE INVENTION

The present invention allows an alarm monitoring service to ally with a PSAP provider to allow our customers to direct connect to the 911 center responsible for their home, but no matter where the customer calls from. When an alarm monitoring company or middleware provider's automatic notification function calls the customer to report an alarm, the customer can connect directly to the local 911 even when traveling, if needed.

The alarm monitoring company contacts the customer if an alarm event occurs and offers the customer the opportunity to connect with the 911 call center for their home. If the customer indicates they want to call 911, the call is routed to the correct PSAP center, with the customers home Caller ID number emulated for the call. In this manner, the PSAP center can determine, from the emulated Caller ID data, the correct response agency that is local to the customer's home.

DETAILED DESCRIPTION OF THE INVENTION

Figure 1:
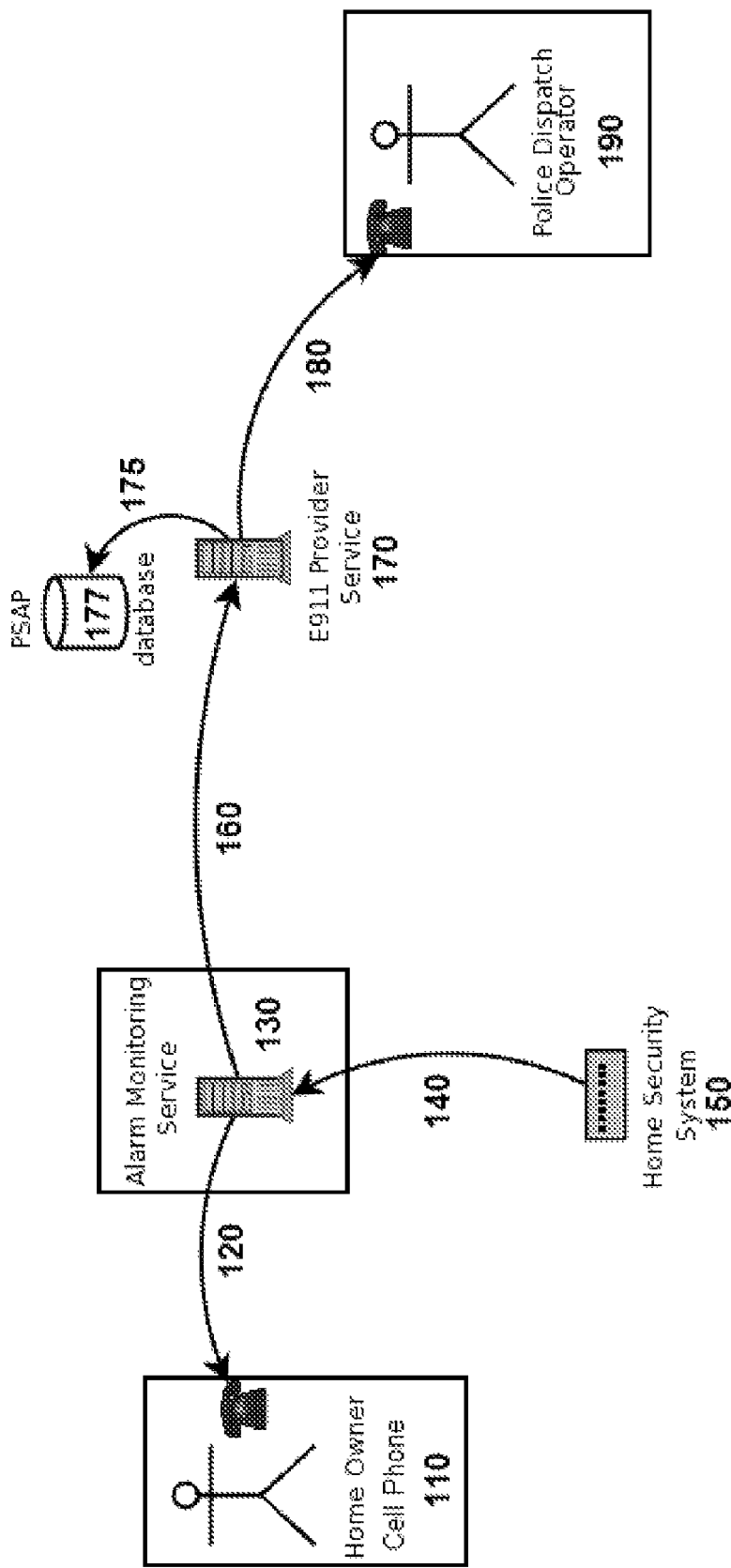
FIG. 1 is a block diagram of the present invention.

Referring to FIG. 1, the main components of the system of the present invention are illustrated. Element 150 comprises the security system, which may be located in a home or business. This security system may comprise, for example, a Prior Art system, such as manufactured by Ademco™ or the like, or a portable alarm system. Security system 150 outputs an alarm signal when one or more alarm conditions occur (e.g., break-in fire, flood, smoke, glass break, panic, sprinkler, or the like).

Element 130 comprises an Alarm Monitoring Service (i.e. NextAlarm, the assignee of the present invention, or another alarm monitoring company). Alarm monitoring service 130 may comprise a traditional alarm monitoring company, using suitable hardware and software to implement the present invention, or may comprise a middleware provider who routes alarm signals to an end alarm monitoring company. Alarm monitoring service 130 have an internal or external customer database which may include contact information (phone numbers and the like) for each customer whose alarm system 150 is monitored by alarm monitoring company 130.

Element 110 is the customer (e.g., homeowner), who is away from home but reachable via cell phone or other communication link (e.g., POTS line, PDA, or the like). Alarm signals are mostly generated when the customer is away from the premises. In an alarm service such as offered by NextAlarm, assignee of the present invention, customer 110 may be contacted when an alarm is triggered by security system 150 to notify customer 110 that an alarm condition has occurred. Customer 110 may then decide whether the alarm is genuine or not, or whether emergency services should be dispatched.

For example, if customer 110 had just set off the alarm by accident, customer 110 may be given the opportunity to cancel the alarm by entering a PIN number or the like. Some alarm systems may allow customer 110 to listen to or view the premises (e.g., via communications link, which may comprise audio and/or video transmissions from the home) to determine whether the alarm is genuine or not. Note that in the example used for purposes of illustration, customer 110 is a homeowner. However, customer 110 may also comprise a business owner, tenant, hotel guest, or even a Recreational Vehicle (or other vehicle) user or the like, or other alarm monitoring service customer.

Element 170 comprises the E911 Service Provider, which includes the PSAP database 177 (connected via network link 175) for local authority phone numbers by address E911 service provider 170 is which is turn connected to the Police and Fire Departments and the like 190 via data link 180. Police and Fire Departments 190 are local to the home. In this instance, "local to the home" means the correct dispatch center 190 for the location where the alarm 150 is located, regardless of whether it is in a home, business, hotel, motel, apartment, or the like.

Figure 2:
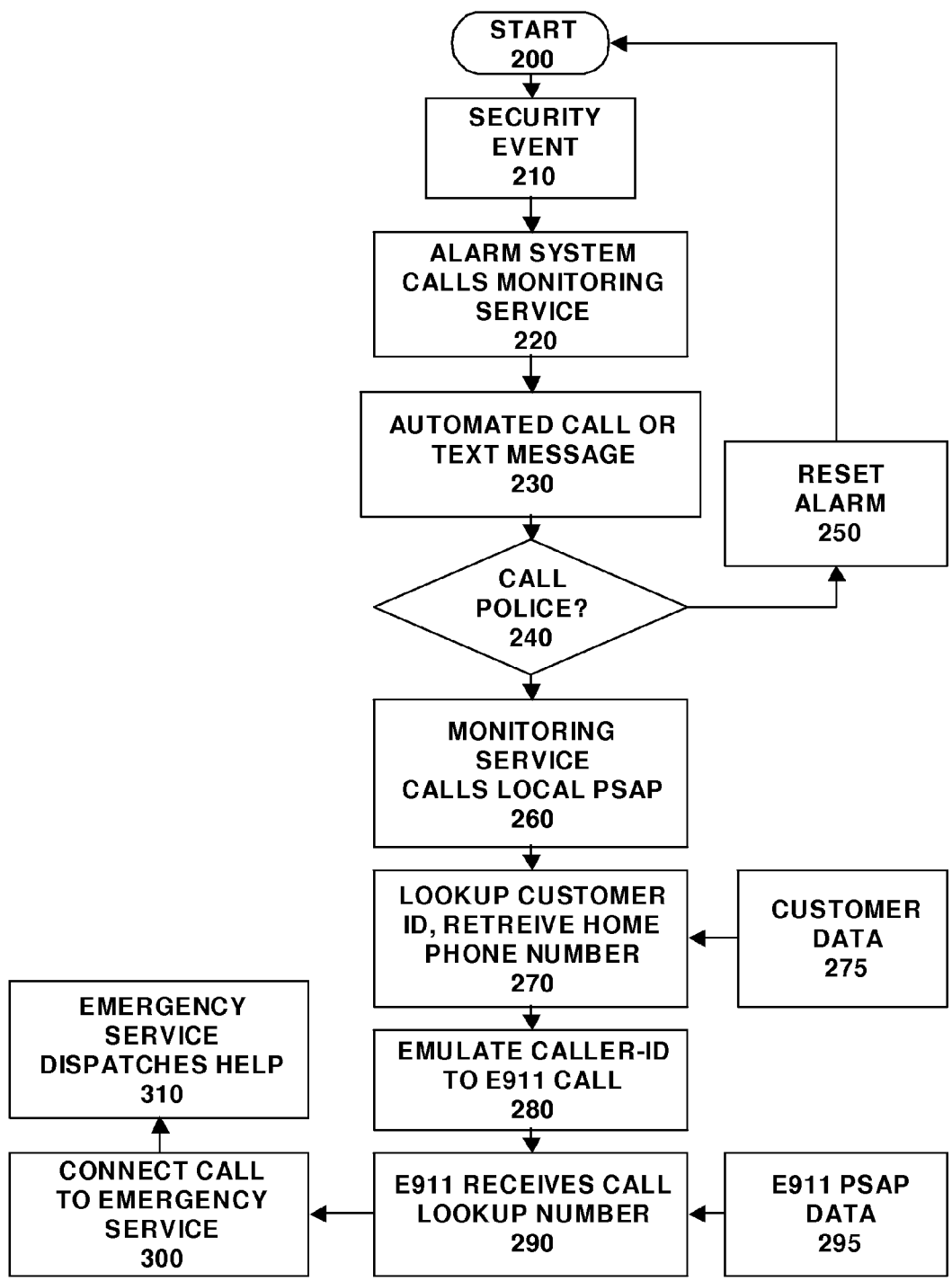
FIG. 2 is a flow chart illustrating the steps of the present invention.

FIG. 2 is a flowchart illustrating the steps of the process used in the system of FIG. 1. Referring to FIGS. 1 and 2, the steps of the process are as follows. The process starts in step 200. In Step 210, security system 150 has a security event, such as a break-in. In step 220, security system 150 calls Alarm Monitoring service 130 over link 140 to report the event. Link 140 may comprise a POTS telephone line analog or digital cellular line, Internet connection, or the like. In step 230, Alarm Monitoring Service 130 issues an automated phone call 120 to the customer 110's cell phone or other remote or portable device. A computer-generated voice may play a message to the user 110 such as "Break-in at your home. Press 1 to call the Police". Alternately, a human operator may talk to the customer 110 or a text message or other communication may be displayed. The user may be prompted for a PIN number to insure that a burglar has not picked up the cell phone and is trying to cancel the alarm.

In step 240, the customer 110 may then press "1" or otherwise indicate that he wishes to have the police or other emergency services (fire, ambulance) summoned. If the customer 110 decides not to contact the Police or other emergency services, or indicates that such services are not to be called (e.g., false alarm) then the alarm system 150 may be reset in step 250 and processing returned to start step 200. If, however, the customer 110 decides or otherwise indicates the alarm is real or the system otherwise indicates that the alarm may be real (e.g., customer fails to properly enter PIN number, customer enters silent alarm PIN number, or the like) then Alarm Monitoring Service 130 then connects the call to the E911 Service Provider 170 over phone or other link 160 in step 260.

Alarm Monitoring Service 130 may connect this call by "emulating" the caller ID of the customer. This emulated Caller ID number may be stored in an internal or external customer database as a data array with each customer identification and associated Caller ID for the customer's home number 275. In step 270, a lookup is made to retrieve the customer home phone number using the customer identification associated with the alarm system 150. Note that the customer identification and the home phone number may, in some embodiments, be the same number. In step 280, the customer 110 home phone number is then inserted as the Caller ID number for the outgoing call which is made from the Alarm Monitoring Service 130 to the E911 center 170.

In step 290, the E911 provider receives the connected telephone call over phone line or other connection 160, and they believe it is the customer calling from within their own home rather than from their cell phone. The E911 provider looks up in its PSAP database 177, the correct data 295 indicating which the Police Department (or other 911 emergency service) should be called for the customer, based upon their home address which is already on file (and which is cross-referenced from the Caller ID of the inbound phone call). In step 300, the E911 provider there connects the call to the appropriate authorities within the local jurisdiction of the caller, who then in turn, in step 310, dispatch emergency services to the customer home as required.

Thus, in the present invention, the customers are allowed to call the authorities "as if" they dialed "911" from inside of their own home, even though they are remote and on a cell phone, and this call is made in response to an event generated by the security system within their home. If the customer is cut off in the 911 call, emergency services will be dispatched to the home where the alarm is located, and not to the customer'remote location. In addition, since most E911 dispatches are made based on Caller-ID information, the customer need not read their address to the dispatcher, thus reducing the time for response and eliminating the possibility that services are dispatched to the wrong address. Moreover, when a 911 call center receives a call having a Caller ID number different than for the address reported for the emergency, all center staff may initially suspect a prank or hoax call. By providing the "correct" Caller ID for the emergency location, the chance of mishap or miscommunication is reduced or eliminated.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A method for allowing a consumer to notify emergency services in the event of an alarm condition, comprising the steps of:

detecting a security event at an alarm location using an alarm system at the alarm location;

the alarm system notifying an alarm monitoring service center to notify the alarm monitoring service center of the alarm event;

the alarm monitoring service center generating an automated message to a consumer that an alarm event has occurred at the alarm location;

the alarm monitoring service center offering to the consumer, in the automated message, a choice to notify emergency services in response to the alarm event;

receiving at the alarm monitoring service center input from the consumer whether to contact the emergency services; and if the consumer indicates a desire to contact emergency service, the alarm monitoring service center automatically connecting the consumer to emergency services through the alarm monitoring service center, wherein the step of sending an automated message from the alarm monitoring service center to a consumer's cellular telephone device that an alarm event has occurred at the alarm location comprises the steps of:

looking up the consumer's cellular phone contact information at the alarm monitoring service center from a database correlating alarm system location to consumer cellular phone contact information; and generating at the alarm monitoring service center at least one of an automated audio message, text message, and video message to the consumer that an alarm even has occurred at the alarm location, wherein the step of connecting the consumer directly to emergency services comprises the steps of:

looking up, at the alarm monitoring service center on a database correlating emergency services contact information to alarm location data emergency services contact information corresponding to the alarm location; and connecting at the alarm monitoring service center, the consumer to emergency services by completing at least one of a cellular phone call, text message, and video message to emergency services from the consumer's cellular telephone device through the alarm monitoring service center, and wherein the step of connecting at the alarm monitoring service center the consumer directly to emergency services further comprises the steps of:

looking up, on a database at the alarm monitoring service center correlating alarm location to a caller ID number for the alarm location; and appending the caller ID number to the at least one of a cellular phone call, text message, and video message made by the alarm monitoring service center to the emergency services.

2. A system for allowing a consumer to notify emergency services in the event of an alarm condition, comprising:

an alarm system located at an alarm location for detecting a security event at the alarm location and notifying an alarm monitoring service center to notify the alarm service of the alarm event;

the alarm monitoring service center receiving notification of an alarm event from the alarm system and generating an automated message to a consumer that an alarm event has occurred at the alarm location, offering to the consumer, in the automated message, a choice to notify emergency services in response to the alarm event, receiving input from the consumer whether to contact the emergency services, and if the consumer indicates a desire to contact emergency service, the alarm monitoring service center connecting the consumer to emergency services though the alarm monitoring service center, wherein alarm monitoring service center further comprises a database correlating alarm system location to consumer cellular phone contact information for looking up the consumer's cellular phone contact information; and wherein the alarm monitoring service center generates at least one of an automated audio, text message, and video message to the consumer that an alarm even has occurred at the alarm location, wherein the alarm monitoring service center further comprises a database correlating emergency services contact information to alarm location data for looking up emergency services contact information corresponding to the alarm location; and wherein the alarm monitoring service center connects the consumer to emergency services by completing at least one of a cellular phone call, text message, and video message to emergency services from the consumer's cellular telephone device through the alarm monitoring service center, and wherein the alarm monitoring service center further comprises a database correlating alarm location to a caller ID number for the alarm location for looking up caller ID number of a consumer; and wherein the alarm monitoring service center appends the caller ID number to the at least one of a cellular phone call, text message, and video message made from the alarm monitoring service center to the emergency services.

* * * * *